Jan. 23, 1968   J. W. JACOBS   3,365,639
LIGHT RESPONSIVE MOTOR START CONTROL CIRCUIT
Filed May 28, 1965   3 Sheets-Sheet 1
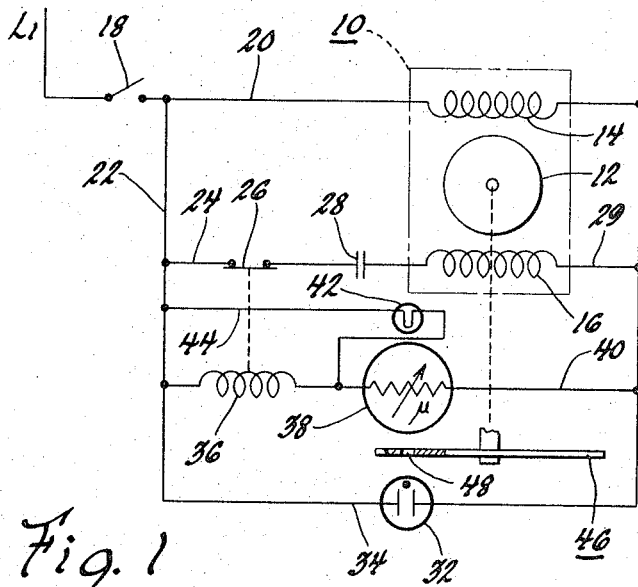
Fig. 1
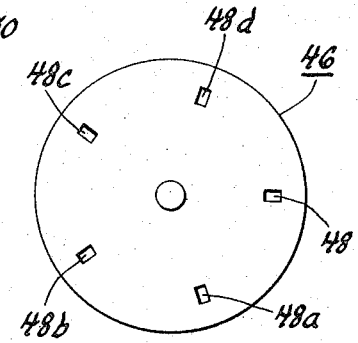
Fig. 2
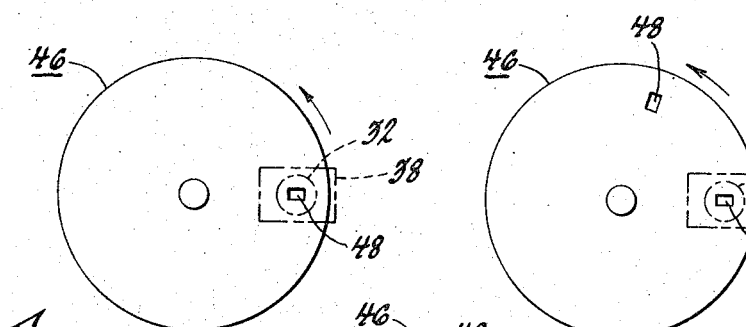
Fig. 3   Fig. 3a
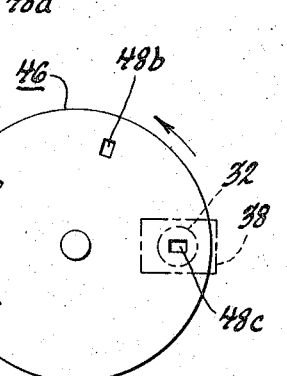
Fig. 3c
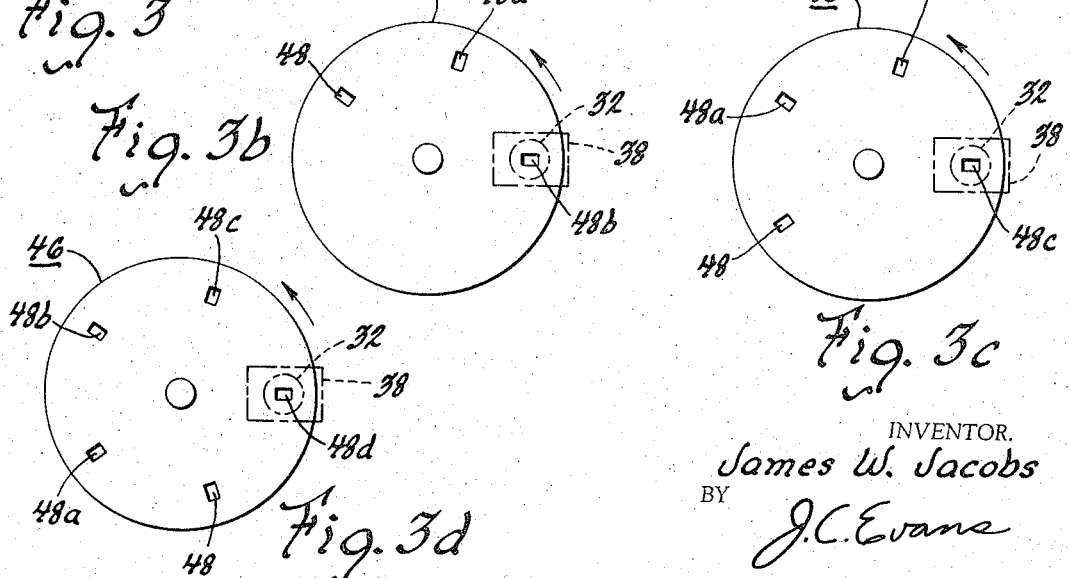
Fig. 3b
Fig. 3d
INVENTOR.
James W. Jacobs
BY
J.C. Evans
HIS ATTORNEY INVENTOR.
James W. Jacobs
BY
J.C. Evans
HIS ATTORNEY INVENTOR.
James W. Jacobs
BY
J. C. Evans
HIS ATTORNEY United States Patent Office 3,365,639
Patented Jan. 23, 1968

3,365,639
LIGHT RESPONSIVE MOTOR START
CONTROL CIRCUIT
James W. Jacobs, Dayton, Ohio, assignor to General
Motors Corporation, Detroit, Mich., a corporation
of Delaware
Filed May 28, 1965, Ser. No. 459,623
7 Claims. (Cl. 318—221)

ABSTRACT OF THE DISCLOSURE

In preferred form, a motor start control circuit including a start switch electrically connecting a motor start winding across a power source, circuit means for operating the start switch at a predetermined motor speed including a light dependent resistor and a pulsating light source operative at a pulsing frequency corresponding to the line frequency of the power source, a rotatable disc having a plurality of angularly spaced openings therein located between the light source and light resistor and operatively connected to the motor to direct the pulsing light to the light dependent resistor at the predetermined motor speed and a start switch holding circuit including a light continuously energized across the power source by means including the light dependent resistor.

This invention relates to electrical control systems and more particularly to electrical control systems having a solid state light responsive component associated with means for regulating the operation of an electrical load.

In many domestic clothes washers and like appliances with electric drive motors having a start winding, the motor must operate against a substantial starting torque. As a result, the drive motors may have a prolonged start period with a duration in the order of 30 seconds. Because of this slow starting characteristic, it has been difficult to accurately switch out a start winding of the motor at a specific speed to assure design speed operation of the motor without hunting. Usually, in such motor arrangements the start windings are cut out at a desired motor operating speed by centrifugal switching arrangements that, in addition to having hunting problems, also have undesirable contact wear. Furthermore, such switches are characterized by a number of mechanically interrelated parts that have an undesirable reliability.

Accordingly, an object of the present invention is to improve electrical control systems for switching an electrical load such as a motor start winding by the provision of a solid state circuit including a light responsive component operatively associated with a means including a pulsating light source operative upon the occurrence of a predetermined condition to direct the energy of the light source against the light responsive component of the solid state circuit to produce an electrical condition that will operate a switch to control the electrical load.

A further object of the present invention is to improve the operation of electrical drive motors having a start winding by the provision of an improved solid state motor starting system including a normally closed start switch for energizing the motor start winding and a solid state control system including a light responsive component associated with a light source and wherein a condition responsive member is operatively disposed between the light source and the light responsive component and operative upon the occurrence of a predetermined condition to direct the energy of the light source against the light responsive component to produce an electrical condition in the solid state circuit that conditions the start switch to take the start winding out of the motor circuit.

A further object of the present invention is to improve switching of a start winding of an electrical motor by the provision of a solid state control circuit including a pulsating light source operated at a predetermined frequency, a light dependent resistor associated with switch means responsive to changes in the resistance of the resistor and condition responsive means normally blocking the light source from the light dependent resistor but operative upon the occurrence of a predetermined condition to be in synchronism with the pulsing light source to cause the energy of the light source to be directed against the light dependent resistor to cause the switch means associated therewith to switch out a motor start winding at a specific speed of operation of the motor.

Still another object of the present invention is to improve the operation of electric motors having a start winding by the provision of a solid state motor starting system including a switch operable to de-energize a motor start winding, and means for operating the switch to de-energize the start winding at a specific speed including a pulsating light source operating at a predetermined frequency, a light dependent resistor having means associated therewith responsive to changes in the resistance of the resistor to open the starting switch, an apertured rotatable member operatively associated with the drive motor and rotated in response to drive motor operation so as to normally block the passage of light from the light source to the resistor but at a predetermined speed having apertures synchronized with the pulsating light source to cause the energy of the light source to be directed against the light dependent resistor to cause an electrical condition that opens the starting switch.

Still another object of the present invention is to improve the operation of electric motors having a start winding by the provision of a solid state motor starting system including means for switching out a motor starting winding, means for operating the switch to take out the start winding at a specific speed including plural pulsating light means operated at a predetermined frequency, light dependent resistor means for receiving energy from the pulsating light source operable to condition the start switch to open the start winding circuit, and light control means for selectively blocking light from one of the light sources at a first predetermined motor speed while allowing light to pass from another of the light sources against the light dependent resistor means, said light control means at a motor speed of a predetermined multiple of the predetermined speed serving to direct light from both light sources against said light dependent resistor to effect the switching operation.

A further object of the present invention is to improve the operation of electrical drive motors having a start winding by the provision of a solid state motor starting circuit including a switch for de-energizing a winding, means for operating the switch at a specific motor operating speed including a plurality of pulsating light sources operating at a predetermined frequency, a light dependent resistor arranged to receive light from each of said light pulsating sources, an apertured rotatable member disposed between said light sources and said light dependent resistors and rotated in response to motor operation, the apertures in said rotatable member being arranged to normally block the passage of light from said light sources until the motor is operated at a first predetermined speed to cause the apertures in the rotatable member to be in synchronism with the pulsating light sources for directing light therefrom against the light dependent resistors to cause an electrical condition change in associated circuit means to open the start switch; and wherein phase shift means are provided in the system to block the passage of light from one light source at the first speed at which the rotatable member is

3 in synchronism with the light sources, said phase shift means being inoperative when the rotatable member is rotated at a multiple of said first speed whereby all of the energy of the light sources is directed to condition the light dependent resistor means to effect the opening of the start winding.

Further objects and advantages of the present invention will be apparent from the following description, reference being had to the accompanying drawings wherein preferred embodiments of the present invention are clearly shown.

In the drawings:

FIGURE 1 is a schematic wiring diagram including the controller of the present invention;

FIGURE 2 is a view in elevation of a speed responsive control member in the circuit of FIGURE 1;

FIGURES 3 through 3d are views of the control member of FIGURE 2 in a plurality of operative positions constituting a predetermined cycle of operation.

Figure 4:
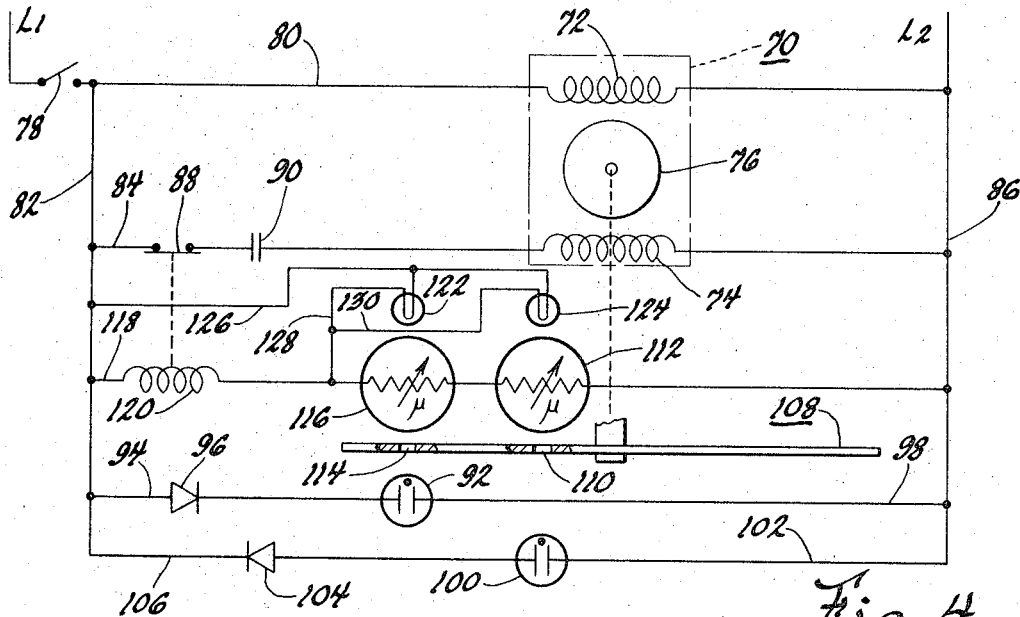
FIGURE 4 is a schematic wiring diagram including another embodiment of the present invention.
Figure 5:
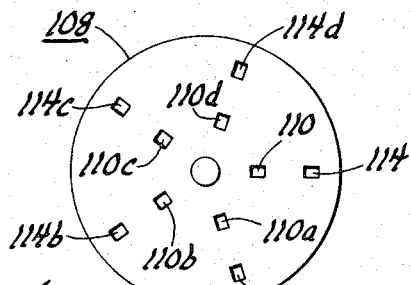
FIGURE 5 is a view of a speed responsive control member of the arrangement in FIGURE 4.

Referring now to the drawings, in FIGURE 1, an electric drive motor 10 is illustrated of the type that is commonly used in domestic appliance applications wherein a motor is associated with means that produce a substantial initial starting load that results in a rather extended start period prior to the time that the motor attains its designed operating speed. The motor 10 more specifically is shown as including a rotor 12 associated with a run winding 14 and a start winding 16. The run winding 14 is electrically connected across wires $L_1$, $L_2$ of a three-wire alternating current power source by a line switch 18 and a conductor 20. The illustrated circuit also includes a start winding energization circuit that runs from wire $L_1$ through line switch 18, conductor 20, a conductor 22, a conductor 24, a relay controlled start switch 26, a start capacitor 28, the winding 16 and conductors 29 and 30 electrically connected to wire $L_2$.

Additionally, the illustrated circuit includes a pulsating light source 32 in a conductor 34 connected across the wires $L_1$, $L_2$ by the conductors 22, 30. The pulsating light source 32 is a neon bulb that is selectively illuminated upon each peak of the cycling line voltage across the lines 22, 30 and thereby can be characterized as having a pulsating frequency corresponding to that of the power source across $L_1$ and $L_2$ which in the typical 220-volt AC power supply circuits is 60 cycles per second.

In the illustrated arrangement the operation of the relay switch 26 depends upon energization of a relay coil 36 connected in series with a solid state photoconductive component 38 by a conductor 40 across conductors 22, 30. As best seen in FIGURE 1, the component 38 is located in alignment with light source 32. The photoconductive component 38, more particularly, is a light dependent resistor, or LDR, having a high dark resistance and a decreasing resistance in the presence of light. Typically, such units are formed from substances such as cadmium sulfide, or cadmium selenide. Additionally, the illustrated circuit includes a circuit holding lamp 42 connected by a conductor 44 across conductors 22 and 40.

Operatively connected to the rotor 12 of the motor 10 is a rotatable disc 46 having a plurality of apertures 48, 48a, 48b, 48c and 48d that are progressively moved into alignment with the component 38 and light source 32 to

4 allow light passage therebetween. In the illustrated arrangement the apertures are circumferentially spaced adjacent the outer periphery of the disc 46 through equal angles shown in the illustrated arrangement as being at 72°. The disc 46 is disposed between the pulsating light source 32 and the light dependent resistor 38 whereby light is selectively controlled from the source to the resistor 38 through the apertures 48, 48d in accordance with the speed of rotation of the disc 46 to control the motor starting switch 26.

When the motor 10 is initially energized the line switch 18 is closed and the starting switch 26 is normally closed whereby the motor run winding 14 and motor start winding 16 are concurrently energized. In a typical case, when the motor 10 is connected to an appliance that imposes a substantial loading on the motor, as for example is the case with a clothes washer, the motor might take 30 seconds to approach the design speed of motor operation. In order to assure a design speed operation of the motor 10, the start winding 16 should be switched out of the motor control circuit by the switch 26 at a specific motor speed related to the desired motor operating speed to avoid hunting problems.

At speeds below the desired switching speed for taking out the start winding 16, the illustrated spacing of the apertures 48, 48d in the disc 46 is such that the disc 46 blocks light from the source 32 from the light dependent resistor 38. When the disc 46 is rotated at a predetermined speed determined by the spacing of the apertures therein and the frequency of pulsation of the light 32, the apertures eventually are synchronized with the pulsating light source 32 so as to cause the full illumination from the source 32 to be directed against the light dependent resistor 38 causing the resistance thereof to be reduced to a predetermined degree whereby current flows through the coil 36 to cause the relay operated start winding switch 26 to open so as to de-energize the start winding 16. Thereafter the motor 10 is solely operated by the run winding 14 at a desired operating speed.

More specifically, when the disc 46 is operated at 720 revolutions per minute in the illustrated arrangement, full illumination will occur as follows. In FIGURE 3, at 720 revolutions per minute of the disc 46, the aperture 48 will instantaneously overlie the pulsing light source 32 as it pulses to full illumination. The light is directed by the aperture 38 against the light dependent resistance 38. In the next succeeding pulse of light from the source 32, the aperture 48 is located as shown in FIGURE 3a and the aperture 48a overlies the light 32 so as to direct the energy thereof against the light dependent resistor 38. In FIGURES 3b through 3d, the disc is shown at progressively advanced positions during one of its rotations at 720 revolutions per minute with the apertures 48b, 48c and 48d being aligned with the light source 32 during each of its succeeding "on" operations whereby it can be seen that during one revolution of the disc 46 at a predetermined speed, namely 720 revolutions per minute for the illustrated angular spacing of the apertures 48, 48d a 60-cycle per second frequency of pulsation of light from the source 32, light dependent resistor 38 is exposed to the full energy output of the light source 32. This illumination with the proper selection of the light dependent resistor 38 is sufficient to reduce the resistance thereof to allow current flow through the conductor 40 to result in the opening of the start switch 26. When the resistance of the light dependent resistor is reduced the holding lamp 32 is energized thereacross through a circuit from $L_1$ through the line switch 18, conductor 22, conductor 44, the light deepndent resistor 38, conductor 40 and conductor 30 to line $L_2$ and the continuous illumination of the light dependent resistor 38 by the light 42 acts to hold start switch 26 in its open position until the line switch 18 is opened.

While a solid state circuit for controlling the operation of the start switch 26 is shown as utilizing a rotatable component for selectively directing the light from a pulsating light source against the photoconductive solid state component, it will be appreciated that the present invention contemplates the use of any equivalent means for blocking light from the pulsating light source during a predetermined start-up period wherein means are included responsive to a predetermined motor speed to direct the light from a light source against a light dependent resistor to produce a switching operation as described above. Additionally, while the pulsing frequency of the light source is shown to be at the line current frequency in the preferred arrangement, it will be appreciated that light sources with a different pulsing frequency would be equally suited for use in the control circuit so long as the control member apertures are matched to the pulsing frequency to produce illumination of an LDR at a desired motor speed.

Figure 7:
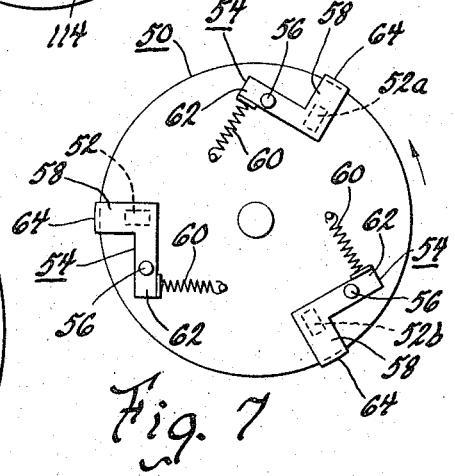
FIGURE 7 is a view in elevation of another embodiment of a control member for use with the present invention.

In the embodiment of FIGURE 7 another form of such an arrangement is illustrated wherein a rotatable disc 50 like disc 46 is shown having a plurality of apertures 52, 52a, 52b therein at predetermined circumferentially located equally angularly spaced locations on the disc 50. In this arrangement each of the openings 52, 52a, 52b is normally closed by shutters 54 pivotally connected on the disc 50 by pins 56. Each of the shutters 54 includes an enlarged end portion 58 that overlies the disc apertures to block the passage of light therethrough. Each of the end portions 58 in the illustrated embodiment is positioned by a spring 60 to close the apertures. The spring 60 is connected to an arm 62 of the shutter 54 at one end thereof and to the disc 50 at the opposite end thereof to cause a bent-over tab or stop 64 on the end portion 58 to engage the outer periphery of the disc 50 when the apertures are closed. When the disc 50 is rotated at a predetermined speed by operation of the motor, the shutter end portions 58 are centrifugally thrown radially outwardly of the disc 50 against the force of the springs 60 until the end portions 58 clear the apertures in the disc 50. When this occurs, a light dependent resistor in a circuit, as is shown in FIGURE 1, is exposed to the illumination of a light source to reduce the resistance thereof to open a switch 26 and energize a holding lamp 42 like those shown in FIGURE 1. The arrangement shown in FIGURE 7 represents a less preferred form of the invention in that it relies upon mechanically actuated centrifugal components that might tend to hang up during operation of the device. Nevertheless, in certain applications, the use of such an arrangement would be perfectly satisfactory.

Referring now to the embodiment of the invention shown in FIGURE 4 an arrangement is shown for association with a solid state light responsive start winding controller wherein means are provided to eliminate the effect of motor operation at a speed that would produce energization of a start winding switch at a first speed below a multiple thereof at which it is desired to cut out the start winding of an electrical motor.

More specifically, in FIGURE 4, a circuit is shown that includes an electric motor 70 like motor 10 in the embodiment of FIGURE 1. Motor 70 includes a run winding 72 and a start winding 74 operatively associated with a rotor 76 for driving a high-starting load as discussed above. Wire $L_1$ is connected to a line switch 78 which, in turn, is connected to a conductor 80 that connects the winding 72 to a wire $L_2$ of a 220-volt alternating current supply having a frequency of 60 cycles per second. The circuit also includes a start winding circuit from wire $L_1$ through line switch 78, a conductor 82 and a conductor 84 for connecting starting winding 74 to a conductor 86 that connects to wire $L_2$. The conductor 84 includes a start winding switch 88 and a start capacitor 90 for controlling the energization of the winding 74.

The circuit additionally includes a first pulsating light source 92 like the light source 32 in FIGURE 1 that is connected to the conductor 82 by a conductor 94 that includes a diode 96 to cause a half-wave DC current to pass through the light source 92 thence through a conductor 98 connected to the conductor 86 and wire $L_2$. Additionally, the circuit includes a second pulsating light source 100 connected from wire $L_2$ to conductor 86 and a conductor 102 to a diode 104 that causes a half-wave DC current to pass through the light 100 that is 180° out of phase with the DC current passing through the light 92. The diode 104 is connected by a conductor 106 to the conductor 82 which, in turn, is connected through the line switch 78 to wire $L_1$ for completing the energization circuit of the light source 100.

Operatively connected to the rotor 76 is a rotatable disc 108 that includes a first plurality of radially inwardly located apertures 110, 110a, 110b, 110c, 110d having a predetermined angular relationship representatively shown as being the same as that of the apertures in the embodiment of FIGURE 1. The apertures 110 through 110d are selectively rotated by the disc 108 to overlie the light source 100 whereby, in certain cases, depending upon the speed of rotation of the disc 108, light is directed through the apertures against a solid state light dependent resistor 112 like resistor 38 in the first embodiment.

Additionally, the disc 108 includes a plurality of circumferentially located apertures 114, 114a, 114b, 114c, 114d that have the same angular spacing as the apertures 110 through 110d and are arranged radially outwardly of the apertures 110 through 110d. The apertures 114 through 114d are selectively positioned by the disc 108 to overlie the light source 92 and depending upon the speed of rotation of the disc 108 will serve to direct the energy of the light source 92 against another solid state light dependent resistor 116 arranged in series with the resistor 112.

As was the case in the first embodiment, the resistors 112, 116 are connected in a switch controlling circuit from wire $L_1$ through line switch 78, conductor 82, thence through a conductor 118 that electrically connects the resistors to conductor 86 thence to wire $L_2$. The conductor 118 further includes a relay coil 120 that, when energized, serves to open the start winding switch 88. When the coil 120 is energized, a plurality of circuit holding lamps 122, 124 are included in a circuit from $L_1$ through line switch 78, conductor 82, a conductor 126 and conductors 128, 130 to conductor 118 thence to conductor 86 and wire $L_2$.

As was discussed above, it is possible to vary the frequency of pulsation of the neon lights in the control circuit but for simplicity, it is desirable to operate them at the frequency of the power supply, namely 60 cycles per second. In order to accomplish this result, the angular relationship of the apertures must be correlated to the 60 cycle per second figure to obtain a desired switching of the start winding at a first predetermined speed of rotation of the apertures. There are many motor applications, however, where the start winding switching should occur at a multiple of the first speed at which the apertures are synchronized with the frequency of the light pulses. To obtain this result, the resistors 112, 116 are selected to produce energization of the coil 120 only when both of the resistors are illuminated by the full energy of both the out of phase pulsating light sources 92, 100. In the illustrated arrangement, when the disc 108 is rotated at 720 revolutions per minute, the first synchronous speed, the pulsing light flashes from the light source 92 are synchronized with the openings 114 through 114d in the disc 108. The pulsing light flashes from the light source 100 at this speed, however, are blocked by the disc 108 since the light pulses are, by virtue of the diode 104, out of phase with the openings 110 through 110d.

Since only one of the light dependent resistors 116 is fully exposed to light, the coil 120 is de-energized and the switch 88 remains closed during this phase of operation.

Figure 6:
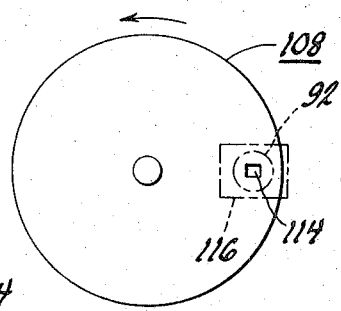
FIGURES 6 through 6i are views of the speed responsive control member of FIGURE 5 in a plurality of operative positions constituting a predetermined cycle of operation.
Figure 6A:
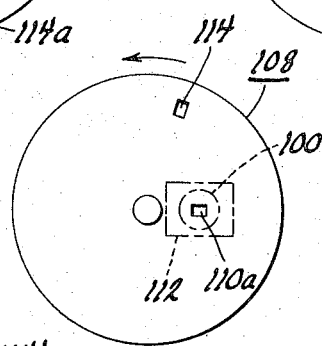
Figure 6B:
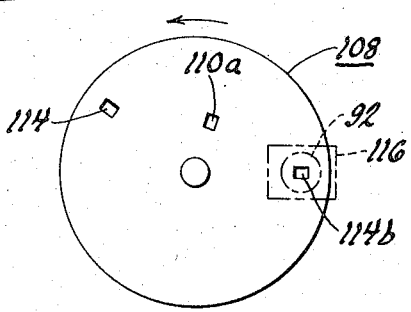
Figure 6C:
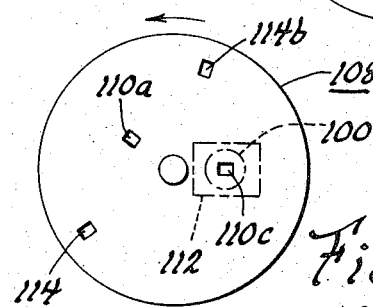
Figure 6D:
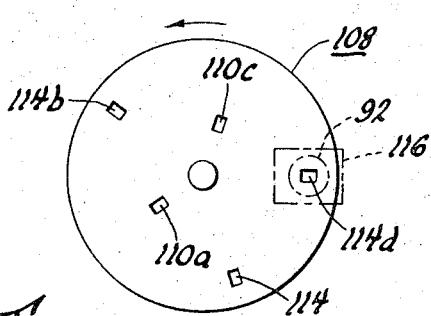
Figure 6E:
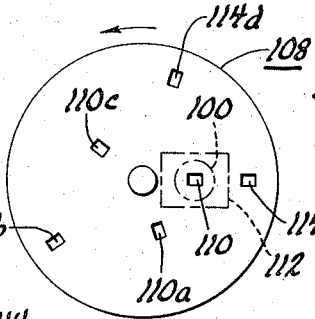
Figure 6F:
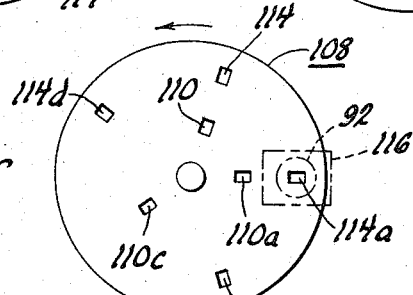
Figure 6G:
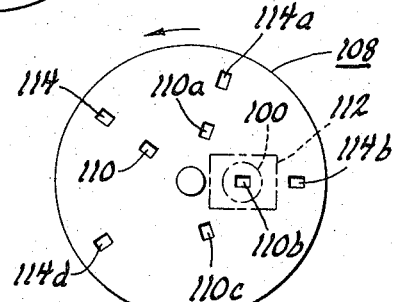
Figure 6H:
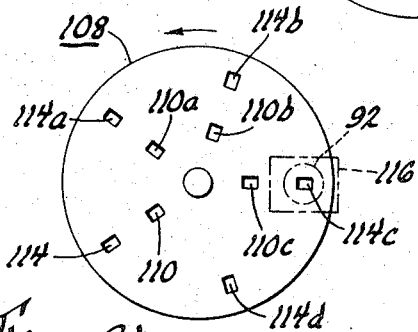
Figure 6I:
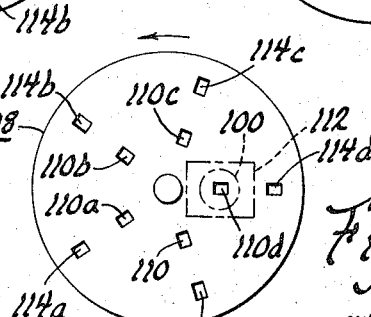

Eventually, when the disc 108 is driven by the motor at 1440 revolutions per minute, the openings therein are synchronized with the pulsing flashes of light from the light sources 92, 100 to cause both the resistors 112, 116 to have a reduced resistance to energize the coil 120 to open the switch 88. More particularly, as shown in FIGURES 6–6i, the disc 108 at 1440 revolutions per minute has a controlling cycle of two revolutions during which the full energy of the light sources 92, 100 is directed against the resistors 112, 116. The start of the cycle is shown in FIGURE 6 which shows disc aperture 114 aligned with the light source 92 as it flashes on so as to direct the energy therefrom against the light dependent resistor 116. As seen in FIGURE 6a, following a 72 degree revolution of disc 108, the openings 114 and 110 are shown advanced from the position in FIGURE 6 and the opening 110a comes into alignment with the light sources 100 as it pulses on 180° out of phase from the previous "on" pulse of the light source 92. Light thereby is directed through the opening 110a against the light dependent resistor 112. At this point, the light source 92 is pulsed off. Upon a further advance of 72 degrees, as seen in FIGURE 6b, the disc aperture 114b is moved into alignment with the light source 92 as it again pulses on to direct the energy of the light 92 against the light dependent resistor 116. In FIGURE 6c is shown a further 72-degree advance of the disc 108 that aligns the disc aperture 110c with the light source 100 during its next succeeding "on" pulse.

In FIGURES 6d through 6i, like step-wise advances of the disc 108 are illustrated wherein the disc openings are advance so that an outer aperture is aligned with the pulsing light 92 when it is pulsed on and then a succeeding inner aperture is advanced into alignment with the light source 100 when it is pulsed on in a progressive manner until following two revolutions of the disc 108 constituting a complete cycle of operation, all of the "on" pulses of both of the light sources are directed through the synchronously driven aperture openings of the disc 108 whereby the full energy of the light source is directed against the light dependent resistors 112, 116 to produce the opening movement of the start switch 88 and the consequent completion of the circuit holding lamps 122, 124 at a precise speed which is a multiple of the first speed at which certain disc openings are synchronized with the frequency of pulsation of the lamp sources.

In the embodiment of FIGURE 4, the light sources may be out-of-phase by an amount less than 180°. In this case, depending upon the phase relationship between the light sources to obtain complete illumination of the light dependent resistors by the pulsing light sources, means must be provided to adjust the aperture spacing in the control disc to compensate for the phase change. An arrangement for accomplishing such an adjustment is shown in FIGURE 8 where a rotatable disc assembly 140 includes an outer annular member or ring 142 having recess 144 at the inner periphery thereof in which is slidably received an adjustable plate 146 that is held in an adjusted position with respect to the ring 142 by screw elements 148, 150 that are directed through plate slots 152, 154, respectively, into threaded engagement with the ring 142.

Figure 8:
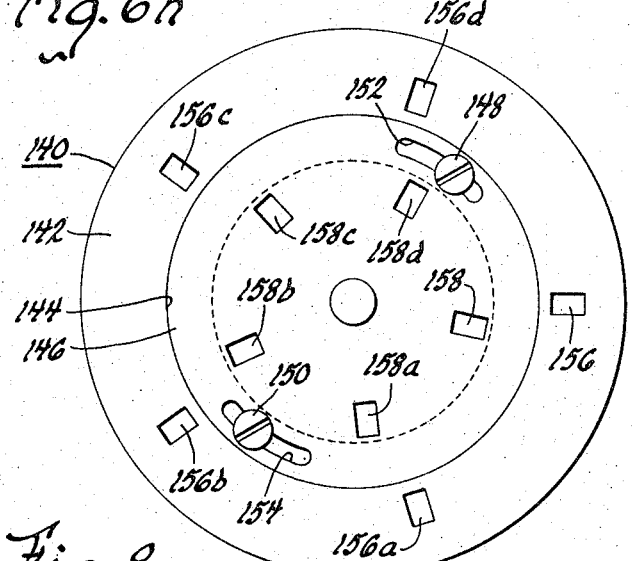
FIGURE 8 is an elevational view of a modification of the speed responsive control component of FIGURE 7.

In the embodiment of FIGURE 8, the ring 142 has a plurality of circumferentially spaced apertures 156, 156a, 156b, 156c, 158c therein, representatively shown as having the spacing of the outer apertures 114–114d in the previously described embodiment. The inner plate 146 includes circumferentially spaced apertures 158, 158a, 158b, 158c, 158d of the same angular spacing of the inner openings 110 in the previously described embodiment. As was the case in the previously described arrangement the outer apertures 156–156d are synchronously arranged with a pulsing light source of 60 cycles per second at both 720 and 1440 revolutions per minute. In the case of the 720 revolutions per minute, the openings progressively align themselves with the pulsing light source and in the case of 1440 revolutions per minute, alternate ones of the outer openings align themselves with the pulsing light source to direct all the energy thereof against a light dependent resistor. By proper adjustment of the inner plate 146, the apertures 158 through 158d therein can be synchronized with a second light source out of phase with the light source aligned with apertures 156–156d but pulsing at the same rate when the disc 140 rotates at higher synchronous speed such as 1440 revolutions per minute whereby the full light energy of both sources is directed against associated light dependent resistors to open a starting circuit.

While the embodiments of the present invention as herein disclosed constitute preferred forms, it is to be understood that other forms might be adopted.

What is claimed is as follows:

1. An electrical control circuit comprising an electrically energizable load, means including switch means for electrically connecting said load to an AC source of power, a plurality of pulsating light sources connected across the source of power, means for producing a predetermined out-of-phase operation of said light sources with respect to one another, a plurality of light dependent resistors, a rotatable member having a plurality of openings therein for directing light from said pulsating light sources against said light dependent resistors, said openings being located in said rotatable member whereby upon rotation thereof at a first predetermined speed light is directed from one of said light sources against one of said light dependent resistors and wherein upon rotation of the member at a greater speed light is directed from both of said light sources against said light dependent resistors, and circuit means conditioned when both of said light dependent resistors are exposed to said light sources for conditioning said switch means to de-energize said load.

2. In the combination of claim 1, a continuous light source operative upon operation of said rotatable member at said second predetermined speed for maintaining said switch means continuously open.

3. In a motor control circuit the combination of, a running winding, a start winding, means including a line switch and a start switch for electrically connecting said windings to a source of power, circuit means including light sensitive semiconductor means for controlling said start switch to de-energize said start winding at a predetermined motor speed, said circuit means including a pulsating light source operative at a pulsing frequency established by the line frequency of the power source and means operative in synchronism with said pulsing frequency at said predetermined motor speed to direct the pulsing light source against said semiconductor means.

4. In the combination of claim 3, said synchronizing means including means for producing a partial directing of light against said semiconductor means at a first predetermined speed and for producing a greater directing of light against said semiconductor means at a second higher predetermined speed.

5. In a motor control circuit, the combination of, a run winding and a start winding, means including a line switch and a start switch for electrically connecting said windings to an alternating current power source, a switch control circuit including a light dependent resistor connected across said power source, a pulsating light source electrically connected across said power source and operative to pulse at a frequency predetermined by the frequency of the line voltage, a rotatable member disposed between said light source and said light dependent resistor including a plurality of openings therein, said rotatable member serving to block said light source from said light dependent resistor through a predetermined motor speed range, said rotatable member having the openings therein in synchronism with said line source pulsing frequency at a predetermined motor speed for directing light against said light dependent resistor to condition said switch control circuit to operate said start switch to de-energize said start winding at said predetermined motor speed.

6. A motor control circuit including a motor start winding and a motor run winding, circuit means for electrically connecting said windings to an alternating power source, said circuit means including a normally closed switch means for energizing said start winding, a rotatable disc having a plurality of apertures therein, means for driving said rotatable disc off said motor, a light source located on one side of said rotatable disc, a light dependent resistor located on the opposite side of said disc, said rotatable disc selectively controlling impingement of light on said light dependent resistor from said light source in accordance with motor speed, means responsive to changes in the resistance of said light dependent resistor for conditioning said switch means to open said start winding circuit when said rotatable disc is rotated at a predetermined speed, said apertures in said rotatable disc being spaced circumferentially therearound at spaced locations thereon, said light source being operated to flash on and off at a predetermined frequency, said switch means being maintained normally closed until said apertures in said rotatable disc are rotated in synchronism with the pulsing frequency of said light source.

7. An electrical control circuit comprising an electrically energizable load, means including a normally closed switch for electrically connecting said load to an alternating current power source, a rotatable member having a plurality of openings therein, pulsating light means on one side of said rotatable member for pulsatingly directing light against said member, light dependent resistor means located on the opposite side of said member for receiving energy from said light means on the opposite side of said member through said openings, control means associated with said light dependent resistor means and responsive to changes in the resistance thereof for conditioning said switch means to de-energize said electrical load, said control means being operative only when said openings in said rotatable member are synchronized with the frequency of operation of said pulsing light means, said light dependent resistor means including a plurality of spaced apart light dependent resistors, said pulsing light means including first and second flashing lights operated at the line frequency of said alternating current source, said rotatable member having a first plurality of openings for directing light from one of said flashing lights to one of said light dependent resistors, said rotatable member including a second plurality of openings for directing light from the other of said flashing lights to the other of said light dependent resistors, said flashing lights and rotatable member being operative to cause synchronization of a first plurality of said openings with one of said flashing lights at a first predetermined speed of rotation for changing the resistance in one of said light dependent resistors and operative upon a second speed of rotation to synchronize all of said openings with said flashing lights to change the resistance of both of said light dependent resistors at a second speed of rotation.

References Cited
UNITED STATES PATENTS

| | | | |
|---|---|---|---|
| 1,315,965 | 9/1919 | Jennings | 318—221.8 |
| 3,023,348 | 2/1962 | Cox | 318—480 XR |
| 3,096,467 | 7/1963 | Angus et al. | 318—480 XR |
| 3,097,302 | 7/1963 | Wayne et al. | 250—231 |
| 3,187,204 | 6/1965 | Adkins | 250—206 XR |
| 3,239,741 | 3/1966 | Rank | 318—480 XR |
| 3,273,626 | 9/1966 | Brown | 318—221 XR |

ORIS L. RADER, *Primary Examiner.*

G. Z. RUBINSON, *Assistant Examiner.*